Jan. 21, 1969  W. L. CHERRY ETAL  3,423,705

SNAP-ACTION MAGNETIC SWITCH

Filed Jan. 12, 1967

INVENTORS.
WALTER L. CHERRY
ERIC L. LONG &
HARRY W. OLSON SR.

Edward C. Threedy
THEIR ATTORNEY.

United States Patent Office 3,423,705
Patented Jan. 21, 1969

3,423,705
SNAP-ACTION MAGNETIC SWITCH
Walter L. Cherry, Eric L. Long, and Harry W. Olson, Sr., Highland Park, Ill., assignors to Cherry Electrical Products Corporation, Highland Park, Ill., a corporation of Illinois
Filed Jan. 12, 1967, Ser. No. 608,824
U.S. Cl. 335—207
Int. Cl. H01h 9/00
14 Claims

ABSTRACT OF THE DISCLOSURE

A reed switch actuated by a snap movement of a plurality of magnets orientated relative to an external armature lead and an external circuit lead of a reed switch, with the magnets inducing a first flux path of the same polarity in such leads of the reed switch and when moved relative thereto inducing a flux of a different polarity in one of the leads while increasing the magnetism of the first flux polarity in the other lead of the switch effecting a positive snap-action switch movement therebetween.

Summary of invention

The invention relates to an electrical switch of the reed type actuated by magnets moved relative to the leads of the reed switch, with a device of this character generally classified in Class 200, Subclass 87.

The switch includes a coil spring over-centering mechanism for pivoting with a snap action a carriage plate upon which is mounted a primary magnet and a secondary magnet. The primary magnet presents a pole face of a given polarity in close proximity to one lead of the reed switch and induces a magnetic flux therein. The secondary magnet presents a surface which defines two opposite polarity pole faces divided by a non-polar boundary. The secondary magnet is positioned in close proximity to another lead of the reed switch and is adapted to induce therein flux paths of opposite polarities depending upon the position of the pole faces relative to such lead of the reed switch.

Upon actuation of the over-centering mechanism, the magnets are orientated by pivotal movement about an axis transverse to the longitudinal plane of the leads of the reed switch. The pivotal movement is such that the known polarity of the flux of the primary magnet is increased in magnetism in one lead of the reed switch while the polarity induced by one of the pole faces in the other lead of the reed switch is reversed so as to effect an attraction between the leads of the reed switch resulting in a switching operation.

The relationship of the magnetic pole faces of the secondary magnet to the one lead of the reed switch as well as the orientation of the opposite polarity faces thereof provides a variable reluctance gap that tends to accelerate a change in the lead position once it is initiated to effect a positive magnetic snap action of the reed switch.

This invention contains a novel combination and arrangement of parts to be hereinafter described and claimed.

The invention will be best understood by reference to the accompanying drawings showing one form of construction and in which.

Figure 1:
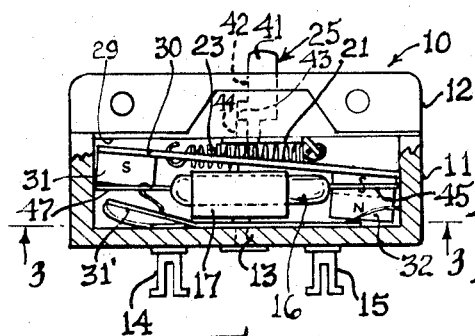
FIG. 1 is a side elevational view of the switch structure showing a portion of the housing thereof in section so as to illustrate the mechanism enclosed therein in its normal or rest position.

The snap-action magnetic switch of this invention is adapted to be contained in a housing 10 which includes a hollow casing 11 having a removable cover 12. Extending through the bottom wall 13 of the casing 11 are spaced apart terminals 14 and 15, it being understood that there is a terminal for each lead of the glass-encased reed-type switch 16 utilized in this invention.

Figure 2:
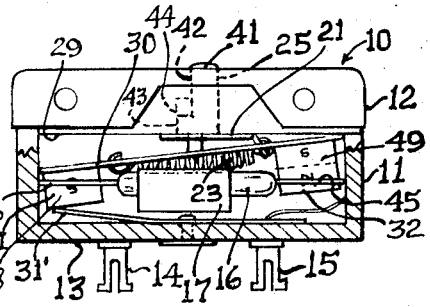
FIG. 2 is a view similar to FIG. 1, but showing a portion thereof in actuated position.
Figure 3:
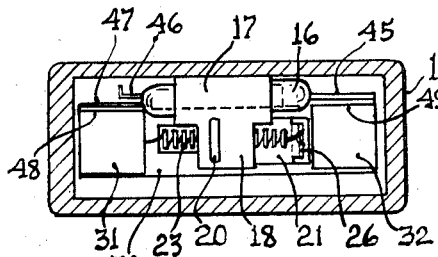
FIG. 3 is a bottom plan view taken on line 3—3 of FIG. 1.
Figure 6:
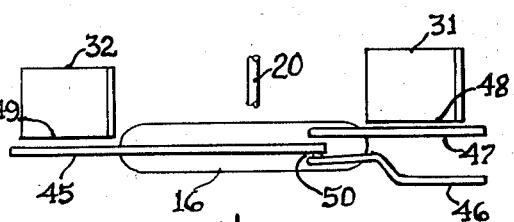
FIG. 6 is a top plan schematic view of certain parts of this invention.

The reed-type switch 16 which may be of any commercial construction, is held within a non-metallic U-shaped mounting bracket 17. This bracket 17 includes a laterally extending arm 18 which has a central opening 19 formed therein which receives the free end portion 20 of a non-ferrous supporting member 21. The supporting member 21 is generally L-shaped and has its medial portion 22 thereof removed so as to provide an opening through which a compression member 23 extends, as well as forming a passage through which the base portion 24 of an external switch actuator 25 may project. The supporting member 21 provides a stud 26 to which is attached the end 27 of the compression member 23, which in the instant application is a coil spring. The supporting member 21 by a rivet (not shown) extending through the attaching aperture 28 formed therein is attached to the underside 29 of the cover 12, as seen in FIGS. 1 and 2. By this arrangement, the mounting bracket 17 is connected to the free end 20 of the L-shaped supporting member 21, which in turn is fixedly connected to the underside of the cover 12 so as to form an integral structure, whereby the reed switch 16 carried by the bracket 17 is positioned within the casing 11.

An elongated non-ferrous carriage plate 30 supports at opposite ends and on one side surface thereof a primary magnet 31 and a secondary magnet 32. The medial portion of the plate 30 is cut out as at 33 to provide an opening through which the free end 20 of the supporting member 21 may be projected prior to its attachment to the mounting bracket 17. This cut-out portion 33 is reduced in width so as to provide opposite facing shoulders 34 and 35, the ends of which are adapted to be seated in V-grooves 36 formed in the separate leg portions 37 and 38 of the free end 20 of the supporting member 21. The opposite end 39 of the coil spring 23 is hooked into an aperture 40 formed in the plate 30 so as to hold the plate 30 into pivotable engagement with the free end 20 of the supporting member 21. Thus, the carriage plate is pivotably connected to the supporting member at a point above the longitudinal plane of the reed switch 16, with the magnets 31 and 32 disposed to one side of the exposed leads thereof, as seen in FIGS. 1 and 2.

The actuator 25 has a domed end 41 which projects outwardly of an opening 42 formed in the top wall of the cover 12. The actuator 25 also provides a laterally extending lug 43 which is adapted to be slidably projected in a recessed groove 44 formed in one wall of the cover 12 which defines the opening 42 for guiding movement therethrough. The base portion 24 of the actuator 25 contacts the compression member 23 at a point adjacent the pivotable connection of the plate 30 with the free end 20 of the supporting member 21, as seen in FIGS. 1 and 2. Upon depression of the actuator 25 as shown in FIG. 2, it will cause the compression member 23 to pass beneath the center line of the carriage plate 30, causing the same to pivot out of position shown in FIG. 1 and into that shown in FIG. 2. This pivotal movement of the plate 30 orients the magnets 31 and 32 with respect to the external leads of the reed type switch 16 for a purpose hereinafter made apparent.

The successful operation of the switch lies in correctly orientating and positioning the magnets 31 and 32 relative to the reed switch 16. To accomplish this feature it necessitates the correcting positioning and arresting of the magnets at the end of their pivotal travel, therefore there is provided on the inside bottom wall 13 of the casing 11 a finger-type dampening spring 31', the free end of which engages the primary magnet 31 to arrest its pivotal travel effectuated by the actuation of the over-centering mechanism. The spring 31' is fixedly attached to the bottom wall of the side 13 in an approved manner and is so positioned that the dampening spring 31' thereof is bent out of the normal plane of the bottom wall so as to lie in the path of travel of the primary magnet 31 so as to be engaged thereby to arrest the movement thereof as well as absorbing the shock of the arresting action so as to correctly position not only the primary magnet 31 but the secondary magnet 32 relative to the leads of the reed switch 16.

Figures 4, 5:
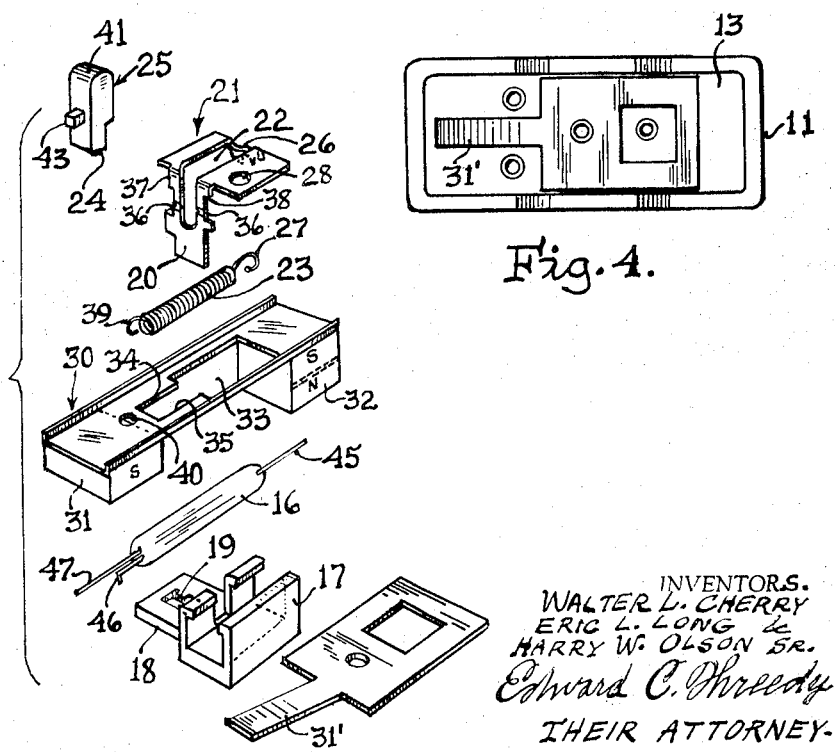
FIG. 4 is a bottom plan view of the underside of the cover for the switch housing.
FIG. 5 is a perspective view of the parts of this invention in exploded relation.

As schematically shown in FIG. 5, the reed type switch 16 includes an armature lead 45 as well as a pair of spaced-apart circuit leads 46 and 47. As shown, the armature lead 45 is inherently spring-biased into contact with the circuit lead 46.

The primary magnet 31 is oriented relative to the circuit lead 47 so that one pole face 48 is positioned in close proximity thereto. This pole face in the present instance can be designated S and as shown in FIG. 1 is not only to one side of the lead 47 but is slightly elevated with respect thereto; however, the relation one to the other will induce an S flux path through the lead 47. The strength of the S flux path is proportional to the reluctance existing through the distance between the magnet pole and the lead. The secondary magnet 32 presents a surface 49 in close proximity to the armature 45, which includes a non-polar area between the S pole of the magnet and the N pole of the magnet, and as shown in FIG. 1, the secondary magnet 32 has its S pole face in closer proximity to the armature lead 45 than its N pole face, thus inducing an S flux path therein.

The secondary magnet 32 is formed to provide the non-polar area between the opposite magnetic polarities on the one surface 49 to accomplish the following results.

The secondary magnet 32 as hereinbefore described permits the maximizing of the polarity magnetism that may be induced into the armature lead 45 of the switching member. The gap between the magnetic pole faces and its relative position with respect to the armature lead 45 provides a variable reluctance gap which tends to accelerate a change in the armature lead's position once movement thereof is initiated by corresponding movement of the primary and secondary magnets 31 and 32, thus effecting a true magnetic snap action movement which is entirely devoid of teasing. The relative position of the magnet pole faces of the secondary magnet 32 as defined by the smallest non-polar boundry therebetween, establishes a positive and limited movement differential between the secondary magnet 32 and the armature lead 45 of the switch member for effecting switching operation.

By this arrangement, a like magnetic flux is introduced in both the armature lead 45 and the circuit lead 47, with such flux lines acting in repulsion to each other to maintain the separation of the free ends of the armature lead 45 and circuit lead 47.

Upon the over-centering of the snap-action of mechanism of the switch, caused by the depression of the actuator 25, the magnets 31 and 32 have their positions changed with respect to the respective armature lead 45 and circuit lead 47. The switch structure will now be in a position shown in FIG. 2, wherein the primary magnet 31 has been pivoted to a point where the center line of the S pole face is longitudinal of the circuit lead 47. The positioning of the primary magnet 31 thus induces a greater S flux force upon the circuit lead 47 by reason of the reduced distance therebetween. Simultaneously, the magnet 32 has been pivoted so that now the N pole face of the surface 49 is in close proximity to the armature 45, changing the induced flux lines therein to an N flux force. This movement of the magnets 31 and 32 produces unlike magnetic flux lines on each of the armature leads 45 and circuit lead 47, effecting an attraction for each other and causing the same to move into contact to establish a completed circuit therethrough. The change in polarity of the flux lines in the armature 45 is accompanied by an increase in the polarity of the opposite flux lines in circuit lead 47 which increases the contact pressure between the armature lead 45 of the circuit lead 47, as well as effecting a faster transit time between the position of the armature lead 45 relative to the circuit leads 46 and 47.

While we have illustrated and described the preferred form of construction for carrying our invention into effect, this is capable of variation and modification without departing from the spirit of the invention. We therefore do not wish to be limited to the precise details of construction set forth, but desire to avail ourselves of such variations and modifications as come within the scope of the appended claims.

Having thus described our invention, what we claim as new and desire to protect by Letters Patent is:

1. A switch device including
   (a) a switching member having an armature lead and a circuit-making lead having their free ends normally in spaced apart relation,
   (b) a first magnet having one pole in close proximity to said circuit-making lead of said switching member such that a first flux path of a predetermined polarity is induced therein,
   (c) a second magnet having its poles in proximity to said armature lead of said switching member, with one pole creating a second flux path of the same polarity as the first flux path in said armature lead,
   (d) means supporting said magnets for movement relative to the longitudinal plane of said switching member, such that the polar positions of said second magnet are reversed, forming an opposite polarity flux in said armature lead of said switching member while reducing the reluctance in said first flux path of said first magnet to increase its polarity flux lines through said circuit-making lead of said switching member, effecting attraction and contact forces between said armature lead and said circuit-making lead.

2. A switch device as defined by claim 1 wherein said first magnet has one pole face of a predetermined polarity in close proximity to said circuit-making lead of said switch member, said second magnet having one surface in close proximity to said armature lead of said switch member with said one surface providing a non-polar limited area defining opposite polarity faces whereby orientation of said one surface of said second magnet relative to said armature lead induces different polarity magnetic flux in said armature lead of said switch member.

3. A switch device as defined by claim 1 wherein said magnets are so oriented that their pole faces are parallel to one another as well as to the leads of said switching member such that the flux lines from said pole faces extend parallel to each other and perpendicular to said leads of said switching member irrespective of the pivotable positions of said magnets relative to said switching member.

4. A switch device as defined by claim 3 wherein said first magnet has one pole face of a predetermined polarity in close proximity to said circuit-making lead of said switch member, said second magnet having one surface in close proximity to said armature lead of said switch member with said one surface providing a non-polar limited area defining opposite-polarity faces whereby orientation of said one surface of said second magnet relative to said armature lead induces different polarity magnetic flux in said armature lead of said switch member.

5. A switch device as defined by claim 2 wherein the means supporting said magnets includes a carriage extending longitudinally of said switching member and supported from a fixed supporting member carried by said switch device, and further includes a compression member connecting said carriage to said supporting member for pivotal movement relative thereto.

6. A switch device as defined by claim 4 wherein the means supporting said magnets includes a carriage extending longitudinally of said switching member and supported from a fixed supporting member carried by said switch device, and further includes a compression member connecting said carriage to said supporting member for pivotal movement relative thereto.

7. A switching device including
   (a) a switch member having an armature lead and a circuit-making lead,
   (b) first and second magnets movably positioned with respect to said switching member such that the first magnet induces a first flux path of a predetermined polarity in said circuit-making lead, with the second magnet inducing a second flux path of the same polarity of the first flux path in said armature lead,
   (c) and means for orienting the positions of the said first and second magnets realtive to each other and to said switch member such that the polarity of said first flux path induced in said circuit-making lead increases in force simultaneously with the changing of the polarity of said second flux path induced by said second magnet in said armature lead to effect attraction and contacting forces between said armature lead and said circuit-making lead.

8. A switch device as defined by claim 7 wherein said first magnet has one pole face of a predetermined polarity in close proximity to said circuit-making lead of said switch member, said second magnet having one surface in close proximity to said armature lead of said switch member with said one surface providing a non-polar limited area defining opposite polarity faces whereby orientation of said one surface of said second magnet relative to said armature lead induces different polarity magnetic flux in said armature lead of said switch member.

9. A switch device comprising
   (a) a non-ferrous supporting member pivotally carrying a magnet-supporting plate,
   (b) a magnet-supporting plate pivotally connected to said supporting member by an over-centering mechanism,
   (c) an over-centering mechanism comprising a compression member extending between and pivotally connecting said magnet-supporting plate to said supporting member,
   (d) a pair of magnets carried at opposite ends of said plate, each in proximity to a switch member attached in a fixed position to said supporting member,
   (e) a switch member fixedly carried by said supporting member and providing an armature lead and a circuit-making lead normally spaced apart from each other,
   (f) said magnets inducing a flux-repelling polarity through said leads of said switch member,
   (g) an actuator for over-centering said compression member to pivot with a snap action said plate and said magnets carried thereby relative to said switch to increase the polarity flux of one of said magnets on the circuit lead of said switch member and to reverse the polarity of the magnetic flux of the other of said magnets on said armature lead of said switch member, causing said leads to be attracted to each other and make contact.

10. A switch device as defined by claim 9 including stop means for positioning said magnets relative to said switch member after they have been moved with a snap action by said over-centering mechanism.

11. A switch device as defined by claim 10 wherein said magnet-supporting plate provides means for absorbing the shock of its striking said stop means after said supporting plate have been pivoted by said over-centering mechanism.

12. A switch device as defined by claim 9 wherein said switch member comprises a sealed reed switch including a magnetic armature lead and a magnetic circuit making lead normally spaced apart from each other.

13. A switch device as defined in claim 10 wherein said switch member comprises a sealed reed switch including a magnetic armature lead and a magnetic circuit making lead normally spaced apart from each other.

14. A switch device defined by claim 11 wherein said switch member comprises a sealed reed switch including a magnetic armature lead and a magnetic circuit making lead normally spaced apart from each other.

References Cited

UNITED STATES PATENTS 3,233,061  2/1966  Jones.
3,283,274  11/1966  De Falco _____ 335—207 X BERNARD A. GILHEANY, *Primary Examiner.*

ROY N. ENVALL, JR., *Assistant Examiner.*

U.S. Cl. X.R.

200—67